United States Patent

Buck

Patent Number: 5,222,718
Date of Patent: Jun. 29, 1993

[54] FLANGED WASHER SPRING

[76] Inventor: David A. Buck, 1348 Sawmill Hwy., Breaux Bridge, La. 70517

[21] Appl. No.: 809,427

[22] Filed: Dec. 18, 1991

[51] Int. Cl.$^5$ .................. F16F 1/34; F21B 31/107; F16B 43/02
[52] U.S. Cl. .................. 267/162; 411/544; 166/178
[58] Field of Search .................. 267/125, 158, 262; 411/162, 544; 166/178; 175/299

[56] References Cited

U.S. PATENT DOCUMENTS

| 1,641,059 | 8/1927 | Tausch | 267/162 |
| 2,534,123 | 12/1950 | Hasselhorn | 267/162 |
| 3,539,026 | 11/1970 | Sutliff | 175/299 |
| 3,884,457 | 5/1975 | Leko | 267/162 |
| 4,043,546 | 8/1977 | Ashfield et al. | 267/162 |
| 4,165,863 | 8/1979 | Schreyer | 267/162 |
| 4,844,157 | 7/1989 | Taylor | 166/178 |
| 5,072,917 | 12/1991 | Pleva | 267/162 |

FOREIGN PATENT DOCUMENTS 1050679  2/1959  Fed. Rep. of Germany ...... 267/162
1208368  1/1986  U.S.S.R. .................. 267/162

Primary Examiner—Robert J. Oberleitner
Assistant Examiner—Chris Schwartz
Attorney, Agent, or Firm—Robert C. Tucker; William David Kiesel

[57] ABSTRACT

A flanged washer spring is provided, comprising a first disk having a central opening, outer periphery, a first side and a second side, the first disk further having an annular inner flange extending axially from the first side, and an annular outer flange extending axially from the second side, wherein a radial distance from the outer flange to the central opening is greater than a radial distance from the inner flange to the central opening. The disks are normally used in pairs with the outer flanges of the disks positioned axially adjacent to each other. The springs may be used in combination with a tool, such as a drilling accelerator or jar, having an elongated tubular body having a body stop for axially retaining a spring, and an elongated mandrel slidingly mounted within the tubular body, the mandrel having a mandrel stop for axially retaining a spring, the spring comprising a plurality of stacked disks.

5 Claims, 4 Drawing Sheets

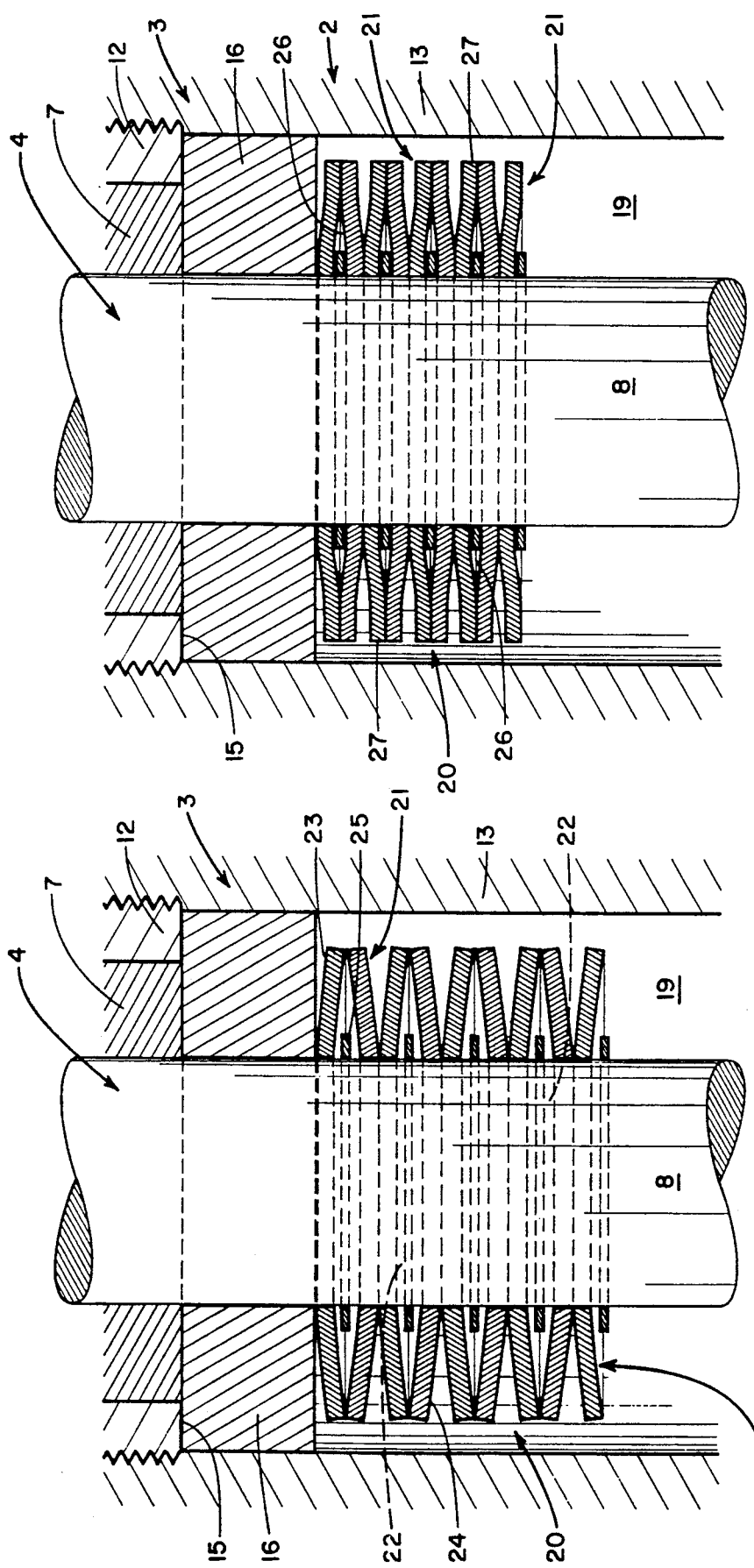

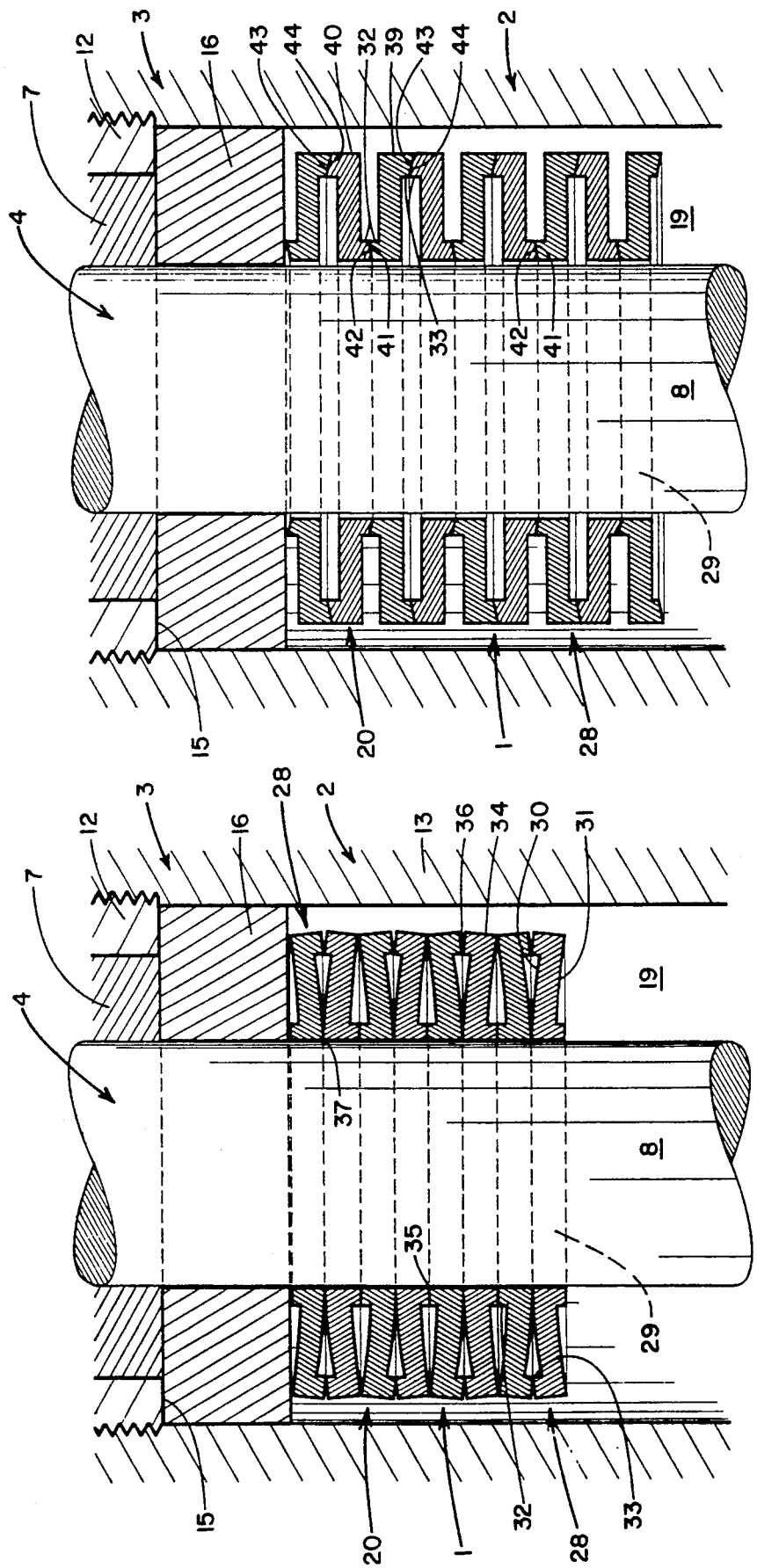

FLANGED WASHER SPRING

BACKGROUND OF THE INVENTION

1. Field of the Invention

This invention relates generally to springs and, more particularly, to springs comprising a stack of shaped washers, such as those used in downhole drilling tools such as accelerators and jars.

2. Prior Art

In drilling tools, such as accelerators or jars, it is common to use springs to store energy between a tubular body and a mandrel slidable within the body. In prior art devices, the type of springs used as a storage device included a stack of dished washers, arranged such that compression of the dished washers resulted in storage of potential energy to be converted to kinetic energy when the springs are released. The number and arrangement of the dished washers determine the energy stored in the springs as well as the stroke supplied to the tool as the springs are released. U.S. Pat. No. 3,539,026 to Sutliff et al. and U.S. Pat. No. 4,844,157 to Taylor exhibit the use of dished washers in accelerators and jars.

There are problems associated with the use of dished washers as springs. As the washers are compressed they can become easily overstressed. In order to prevent overstressing, spacers are inserted between the washers in order to prevent complete flattening under pressure. Such spacers are shown in FIGS. 2 and 3 herein. The use of spacers not only increases the amount of material and number of components of the springs, but also increases the overall length of the spring assembly by limiting the stroke associated with each combination of washers. Also, as dished washers are compressed, friction from the facing surfaces rubbing together becomes a factor in determining how much energy is required to compress the springs and how much potential energy is stored in the compressed springs. Another problem which exists in the use of dished washer springs results from the washers sliding off center before compression, causing uneven loading of the stack of washers.

SUMMARY OF THE INVENTION

Therefore, it is an object of this invention to provide a flanged washer spring which has the versatility of a dished washer spring, but which does not require spacers to prevent overstressing.

It is another object of this invention to provide a flanged washer spring which minimizes the frictional contact between facing surfaces when the spring is compressed.

It is still another object of this invention to provide a flanged washer spring which, when stacked, maintains its position relative to a mandrel.

It is a further object of this invention to provide a flanged washer spring which accomplishes various combinations of the above objects.

Accordingly, a flanged washer spring is provided, comprising a disk having a central opening, outer periphery, a first side and a second side, the disk further having an annular inner flange extending axially from the first side, and an annular outer flange extending axially from the second side, wherein a radial distance from the outer flange to the central opening is greater than a radial distance from the inner flange to the central opening. The disks are normally used in pairs with the outer flanges of the disks positioned axially adjacent to and abutting each other. The springs may be used in combination with a tool, such as a drilling accelerator or jar, having an elongated tubular body having a body stop for axially retaining a spring, and an elongated mandrel slidingly mounted within the tubular body, the mandrel having a mandrel stop for axially retaining a spring, the spring comprising a plurality of stacked flanged washer springs.

BRIEF DESCRIPTION OF THE DRAWINGS

FIG. 2 is a sectional view of prior art dished washer springs in a stacked, uncompressed position.

FIG. 3 is a sectional view of prior art dished washer springs in a stacked, compressed position.

FIG. 6 is a sectional view of an embodiment of the invention in a stacked, compressed position.

FIG. 7 is a sectional view of an alternate embodiment of the invention in a stacked, uncompressed position.

DETAILED DESCRIPTION OF PREFERRED EMBODIMENTS OF THE INVENTION

Figure 1:
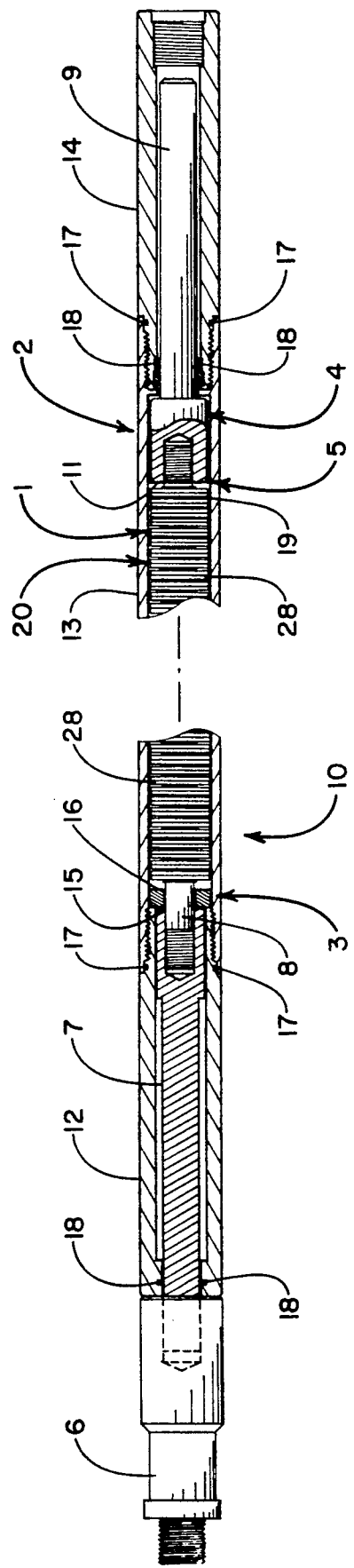
FIG. 1 is a sectional view of an accelerator tool with an embodiment of the invention incorporated therein.

An accelerator tool 10 is shown in FIG. 1. While an accelerator 10 is shown, no limitation is intended concerning the use of the flanged washer spring 1 with any tool 10 having an elongated tubular body 2 having a body stop means 3 for axially retaining a spring assembly 20, an elongated mandrel 4 slidingly mounted within body 2, having a mandrel stop means 5 for axially retaining spring assembly 20. Flanged washer spring 1 may be used in other applications as well. Spring assembly 20 is interposed between body stop means 3 and mandrel stop means 5.

Accelerator 10 is provided with an upper connection 6, connectable to a drill string or other suitable means. Upper connection 6 is threadably connected to upper section 7 of mandrel 4, which is slidable in tubular body 2. Upper section 7 is threadably connected to spring section 8, which is threadably connected to lower section 9, as shown. Lower section 9 is of a larger diameter than spring section 8, forming a lower shoulder 11, which acts as mandrel stop means 5.

Tubular body 2 comprises an upper section 12, threadably connected to a middle section 13, which is threadably connected to a lower section 14. Lower section 14 of body 2 is connectable to a jar (not shown) or other suitable means to which the energy stored in spring 1 is desired to be transferred. Upper section 12 is of a smaller internal diameter than middle section 13, forming an upper shoulder 15 which retains stop washer 16 and acts as a body stop means 3. Suitable body seals 17 and mandrel seals 18 are provided to isolate the internal components of the tool 10. Typically, mandrel seals 18 contain a lubricant in spring chamber 19 within body 2.

Thus, as tensile force is applied to upper connection 6, mandrel 4 is pulled, compressing spring assembly 20 between body stop means 3 and mandrel stop means 5. In the past, spring assembly 20 comprised a stack of dished washer springs 21, as shown in FIGS. 2 and 3. As shown in FIG. 2, dished washer springs 21 are dish-shaped and, when uncompressed, form a void 22 between and upper dished washer 23 and a lower dished washer 24. As shown in the patents to Taylor and Sutliff et al., referred to above, dished washers 23,24 may be used singly or stacked in various combinations to achieve the desired spring action and stroke in tool 10. Spacers 25 are interposed between dished washers 23,24 to prevent overcompression.

As shown in FIG. 3, when compressed, dished washers 23,24 flatten against spacer 25 but are not completely flattened, leaving a protective void 26 around spacer 25. Thus, the complete stroke available from a pair of dished washers 23,24 is not achieved in order to prevent overcompression. Further, as dished washers 23,24 are compressed, surface contact increases from outer edges 27 inward, creating frictional energy losses in spring assembly 20.

The flanged washer spring 1, shown in FIGS. 1 and 4-7, improves the performance and versatility of spring assembly 20, eliminating the need for spacers 25. As a single element (shown in FIG. 4), flanged washer spring 1 comprises a disk 28 having a central opening 29 which surrounds mandrel 4 when installed. Disk 28 further has a first side 30, a second side 31, an inner annular flange 32 and an outer annular flange 33. Inner annular flange 32 extends axially from first side 30, preferably radially adjacent to central opening 29, as shown. Outer annular flange 33 extends axially from second side 31, preferably radially adjacent to the outer periphery 34 of disk 28, as shown. As will be seen, it is essential that the radial distance from outer annular flange 33 to central opening 29 be greater than the radial distance from inner annular flange 32 to central opening 29, in order for the spring 1 to compress. In most applications, it is preferred that the axial length of inner flange 32 equal the axial length of outer flange 33.

Figure 5:
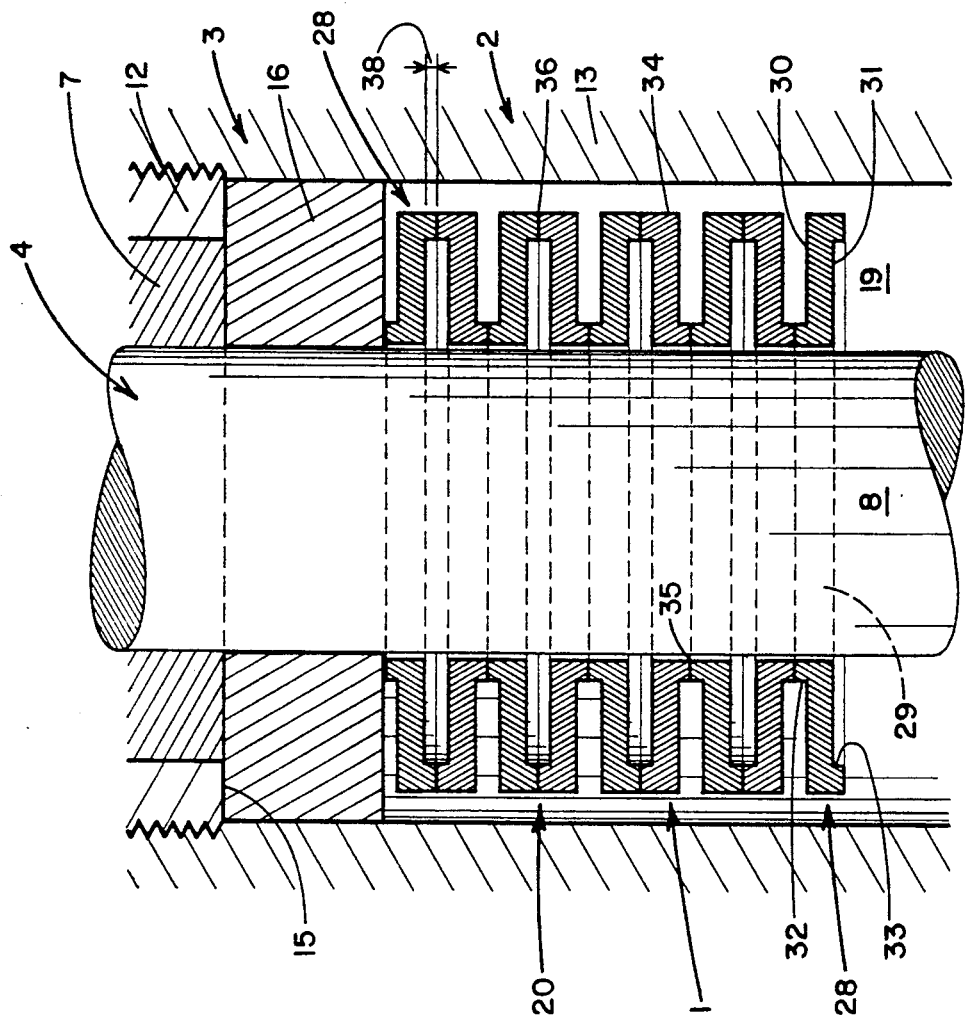
FIG. 5 is a sectional view of an embodiment of the invention in a stacked, uncompressed position.
Figure 4:
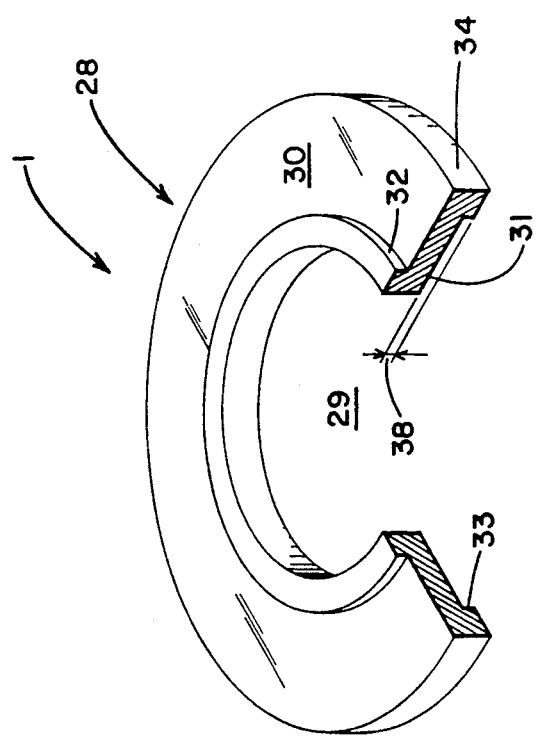
FIG. 4 is a perspective view with a partial cutaway section of an embodiment of the invention.

In most applications, multiple springs 1 will be used. FIG. 5 sectionally depicts a typical stack of springs 1, wherein a plurality of disks 28 are used, with the disks 28 stacked such that when the first side 30 of a disk 28 faces the first side 30 of a second disk 28, the inner flanges 32 of the disks 28 will abut, as shown at 35 in FIG. 5. When a second side 31 of a disk 28 faces a second side 31 of a second disk, the outer flanges 33 of the disks will abut, as shown at 36 in FIG. 5. Typically, the disks 28 are stacked in pairs, as shown. However, if a greater force over a shorter stroke is desired, some of the disks 28 may be stacked with the second side 31 of one disk 28 facing the first side 30 of an adjacent disk 28, similar to the stacking of prior art dished washer springs, such as those shown in Sutliff et al. FIG. 3. Of course, when spring action is desired, second side 31 must face a flat surface or the second side 31 of an axially adjacent disk 28.

FIG. 6 shows a stack of springs 1 in a compressed state. When opposing disks 28 are compressed, second sides 31 are compressed until they abut, as shown at 37 in FIG. 6. Thus, the stroke of any one disk 28 is equal to the axial length of outer flange 33, depicted at 38. In order to calculate the stroke created by a spring assembly 20 in the configuration shown in FIGS. 5 and 6, one need only multiply the number of springs 1 by the length 38 of outer flange 33. No spacers 25 are necessary, and the amount of flex created when springs 1 are compressed is controlled by the axial length 38 of outer flange 33.

In order to facilitate stacking of disks 28 as well as maintenance of a centered relationship with respect to mandrel 4, beveled surfaces may be provided, as shown in FIG. 7. The inner flange 32 of a first disk 39 may be provided with a beveled bearing surface 41. A second disk 40 having an inner flange 32 facing and abutting inner flange 32 of first disk 39 is provided with a beveled bearing surface 42 matingly engageable with bearing surface 41. Similarly, opposing outer flanges 33 may be provided with matingly engageable beveled bearing surfaces 43,44. It is preferred that bearing surfaces 41 and 43 slope in opposite directions, as shown. The same is true for bearing surfaces 42 and 44.

As can be seen, a flanged washer spring 1 is provided which eliminates the need for spacers 25. The springs 1 are easily constructable and readily stackable. Other embodiments and uses of the invention will occur to those skilled in the art, and are intended to be included within the scope and spirit of the following claims.

I claim:

1. In combination with a tool having an elongated tubular body having a body stop means for axially retaining a spring, and an elongated mandrel slidingly mounted within said tubular body, said mandrel having a mandrel stop means for axially retaining a spring assembly, an improvement comparing a spring assembly interposed between said stop means of said body and said stop means of said mandrel, said spring assembly comprising:

a plurality of disks, each disk having a central opening with an axis therethrough, an outer periphery, a first side and a second side, said disks further having an annular inner flange extending axially from said first side, and an annular outer flange extending axially from said second side, wherein a radial distance from said outer flange to said central opening is greater than a radial distance from said inner flange to said central opening, and wherein said fist and second sides extend perpendicular from said axis of said central opening, and said plurality of disks are slidably mounted on said mandrel between said body stop means and said mandrel stop means, said mandrel passing through said central opening of said disks, and wherein said plurality of disks are arranged such t when a first side of a first disks faces a first side of a second disks an inner flange of said first disk will abut an inner flange of said second disk, and when a second side of said first disks faces a second side of a third disk said outer flange of said first disk will abut an outer flange of said third disk.

2. A spring assembly according to claim 1, wherein said inner flange of said first disk is provided with a beveled bearing surface and said inner flange of said second disk is provided with a beveled bearing surface matingly engageable with said bearing surface of said inner flange of said first disk.

3. A spring assembly according to claim 2, wherein said outer flange of said first disk is provided with a beveled bearing surface and said outer flange of said third disk is provided with a beveled bearing surface matingly engageable with said bearing surface of outer flange of said first disk.

4. A spring assembly according to claim 1, wherein said outer flange of said first disk is provided with a beveled bearing surface and said outer flange of said third disk is provided with a beveled bearing surface matingly engageable with said bearing surface of outer flange of said first disk.

5. A spring assembly according to claim 1, wherein said inner flange of each said first, second, and third disk is radially adjacent to said central opening of said first, second, and third disk and sad outer flange of each said disk is radially adjacent to said outer periphery of each disk.

* * * * *